United States Patent [19]
Young

[11] Patent Number: 5,533,899
[45] Date of Patent: Jul. 9, 1996

[54] MOTORCYCLE TRAINER

[76] Inventor: Jerry Young, 8701 Bel Air Ct., Westminster, Calif. 92683

[21] Appl. No.: 457,980

[22] Filed: Jun. 1, 1995

[51] Int. Cl.⁶ .......................... A63G 31/02; A63B 21/00; G09B 9/04
[52] U.S. Cl. .................. 434/61; 482/51; 482/57; 472/97; 472/105; 472/135; 601/26
[58] Field of Search .................. 434/29, 60, 61, 434/46; 472/95–97, 103–105, 131, 134, 135, 137; 482/51, 57, 130, 142; 446/7, 440; 601/26, 49, 86, 90, 98, 100; 73/663, 665, 666, 667

[56] References Cited

U.S. PATENT DOCUMENTS

| | | | |
|---|---|---|---|
| 1,791,777 | 2/1931 | Webb | 601/90 |
| 3,529,311 | 9/1970 | Crawford | 601/100 |
| 3,686,776 | 8/1972 | Dahl | 434/61 |
| 4,049,262 | 9/1977 | Cunningham, Jr. | 472/135 |
| 4,978,300 | 12/1990 | Letovsky et al. | 434/61 |
| 5,076,792 | 12/1991 | Niermann | 434/61 |
| 5,088,473 | 2/1992 | Chen et al. | 601/26 |
| 5,180,338 | 1/1993 | Pinto | 472/96 |
| 5,209,662 | 5/1993 | Fujita et al. | 434/61 |
| 5,240,417 | 8/1993 | Smithson et al. | 434/61 |
| 5,429,562 | 7/1995 | Milner | 482/142 |

FOREIGN PATENT DOCUMENTS

| | | | |
|---|---|---|---|
| 4221602 | 3/1993 | Germany | 434/61 |
| 1-232380 | 9/1989 | Japan | 434/61 |

*Primary Examiner*—Richard J. Apley
*Assistant Examiner*—Victor K. Hwang
*Attorney, Agent, or Firm*—Dennis W. Beech

[57] ABSTRACT

The motorcycle trainer is a fixed location simulated motorcycle motion producing device. A frame and operating components are covered by a motorcycle trainer body having a seat and foot pads so the user may sit on the trainer as if on a motorcycle. Handlebars are attached to the frame in the normal manner for a motorcycle. The frame is mounted on a spring plate assembly using rotational joints and an eccentric lever attached to an eccentric motor also mounted on the spring plate assembly. The motion of the eccentric lever provides vertical motion on the front portion of the motorcycle trainer. The spring plate assembly is mounted on a base plate using rotational joints and a fluid pressure device is attached between the spring plate assembly and the base plate to provide vertical motion on the rear portion of the motorcycle trainer. The spring plate assemble has a universal joint to allow motion from side-to-side on the motorcycle trainer as well as vertically. The attachment also provides a small front and rear pitching motion.

9 Claims, 6 Drawing Sheets

MOTORCYCLE TRAINER

BACKGROUND OF THE INVENTION

1. Field of the Invention

This invention relates to devices used to exercise or to train persons who ride motorcycles particularly in rugged terrain. The new device has the general shape of a motorcycle to simulate actually being seated on and riding a motorcycle. However, the trainer is a fixed location device having powered mechanisms to provide vertical motion to provide exercise as if rugged terrain were being encountered.

2. Description of Related Art

There are currently in use many devices to exercise the various muscles of the body. These exercise devices are commonly found in gymnasiums or weight rooms and are designed to exercise specific muscles of the human body depending on the weights or apparatus being used.

An example of such a device is the fixed position exercise bicycle. Such an exercise bicycle does not have the normal bicycle wheels, but has a bicycle frame mounted on a platform. The person sits on the seat as if on a bicycle and uses their legs to peddle the device. Usually the peddles are connected to a weight or friction wheel such that the amount of exercise energy used can be varied. Sometimes the handlebars are connected to a friction mechanism to allow the exerciser to push and pull on the handlebars to give a form of upper body exercise.

Another type of trainer, exerciser and entertainment device which is electro-mechanically powered is the popular mechanical bull. This device provides a body to simulate sitting on a bull such as might be done in a rodeo. The body has a mechanism which may include hydraulics and mechanical lever devices which are electronically powered. The body is caused to rotate and move up and down either under control of an operator or through a sequence programmed into the device electronic controls.

The present invention provides the general shape of a motorcycle for sitting and gripping of the handlebars as well as placement of the feet. The trainer frame is pivotally mounted on a spring plate assembly with the spring plate assembly pivotally mounted to a fixed location base such that an attached powered fluid pressure device causes vertical motion of the spring plate assembly and trainer frame. In addition the trainer frame may be vertically moved by a power device such as an eccentric motor. The spring plate assembly also allows the user of the trainer to lean to the left or right side as if shifting the riders weight to account for shifts in center of gravity due to centrifugal force when riding a motorcycle. The two vertical motion powered devices act independently to provide motion for exercise as on a motorcycle on uneven terrain. The throttle on the handlebar may be used to control the speed of the powered device to allow the user to control the intensity of exercise.

SUMMARY OF THE INVENTION

A primary objective of the present invention is to provide a means to train or exercise a motorcycle user's muscles to reduce the fatigue encountered when riding a motorcycle on rough terrain such as in motorcross racing. Another object is to provide such exercise on a fixed location device which allows the exercise user to sit similar to an actual motorcycle including gripping of handlebars. A further object is to provide powered devices to provide vertical motion of the trainer as a rider might experience when riding motorcycles on rugged terrain. Another objective is to control the speed of the powered devices by use of a handlebar throttle. A further object is to provide a means for the user to lean side-to-side to shift weight and center of gravity.

In accordance with the description presented herein, other objectives of this invention will become apparent when the description and drawings are reviewed.

DESCRIPTION OF THE PREFERRED EMBODIMENT

The motorcycle trainer consists of a plastic molded body mounted on a frame wherein the body provides a seat for the user and handlebars and foot pads are mounted on the frame. The frame is pivotally mounted on a spring plate assembly and also attached to an eccentric lever which is powered to provide vertical motion of the frame. The spring plate assembly is pivotally mounted to a fixed base and the spring plate assembly has a shock tower attached which is connected to a fluid pressure device to provide vertical motion to the spring plate assembly. The combination of springs and a universal joint in the spring plate assembly provide post powered secondary vertical damping motion as well as rotation about the longitudinal axis. The vertical motion elements are electro-mechanical devices the speed of which may be electronically controlled.

Figure 1:
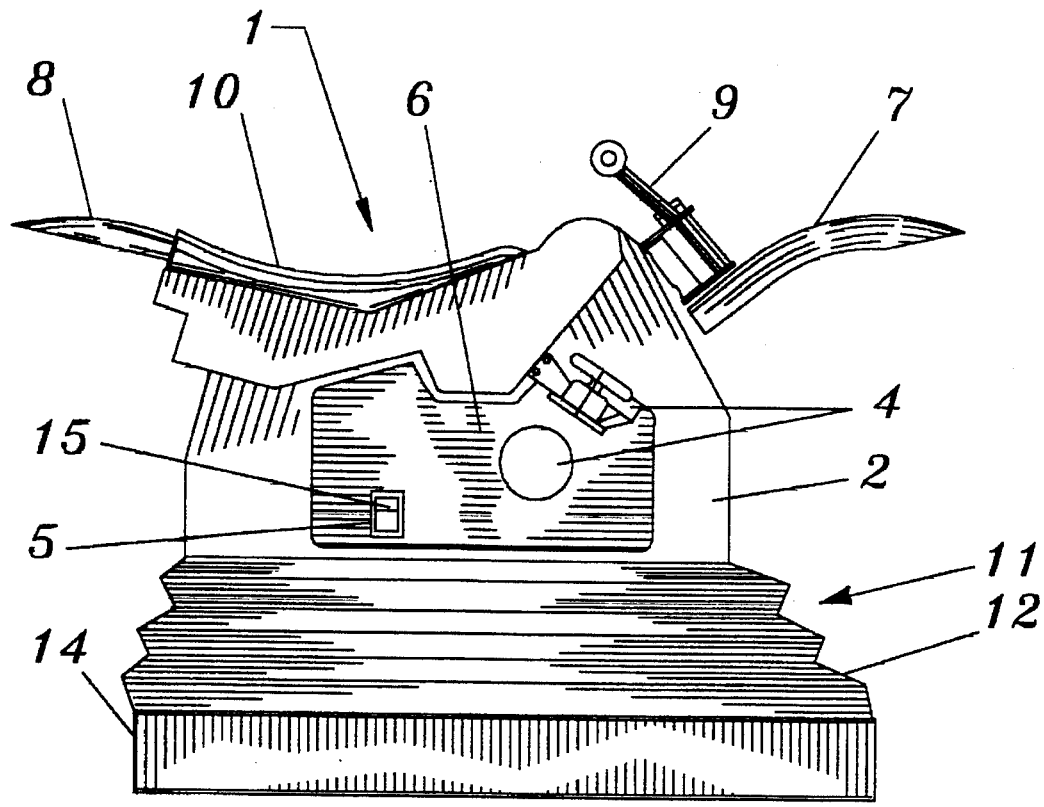
FIG. 1 illustrates a side view of the motorcycle trainer.
Figure 2:
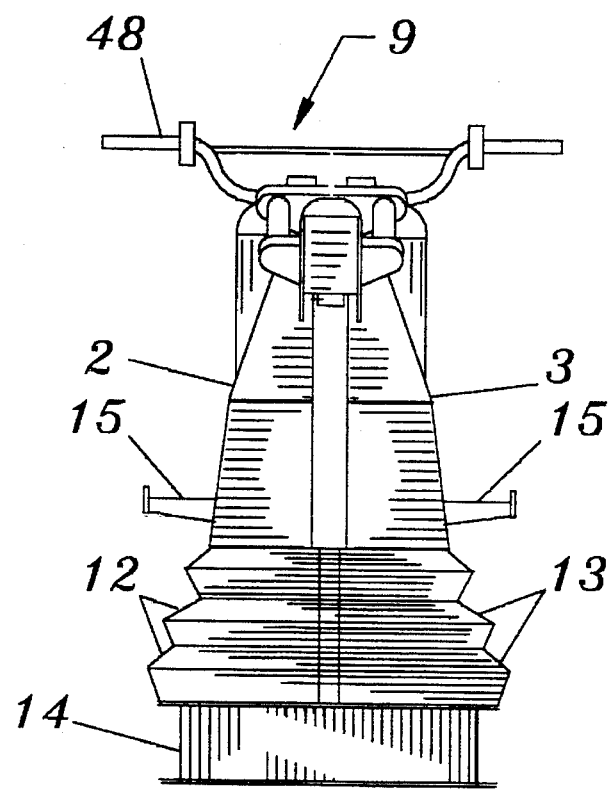
FIG. 2 illustrates a front view of the motorcycle trainer.
Figure 3:
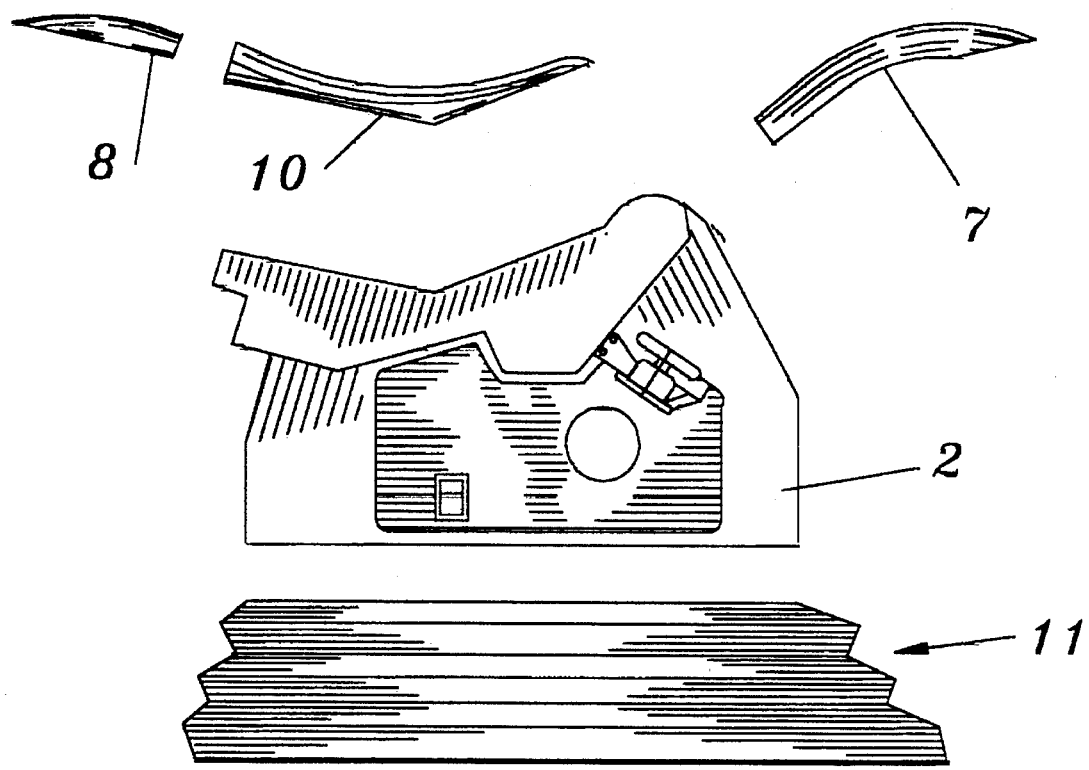
FIG. 3 illustrates an exploded side view of the motorcycle trainer body elements.
Figure 4:
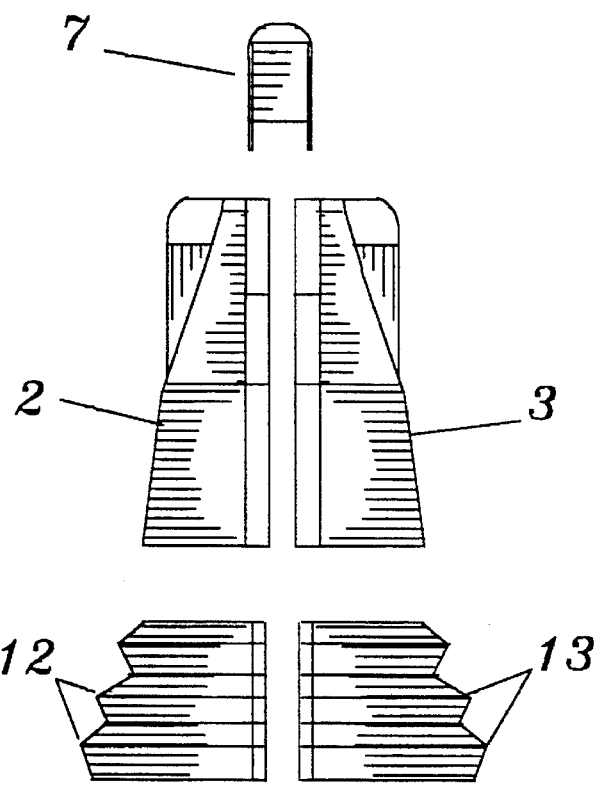
FIG. 4 illustrates an exploded front view of the motorcycle trainer body elements
Figure 5:
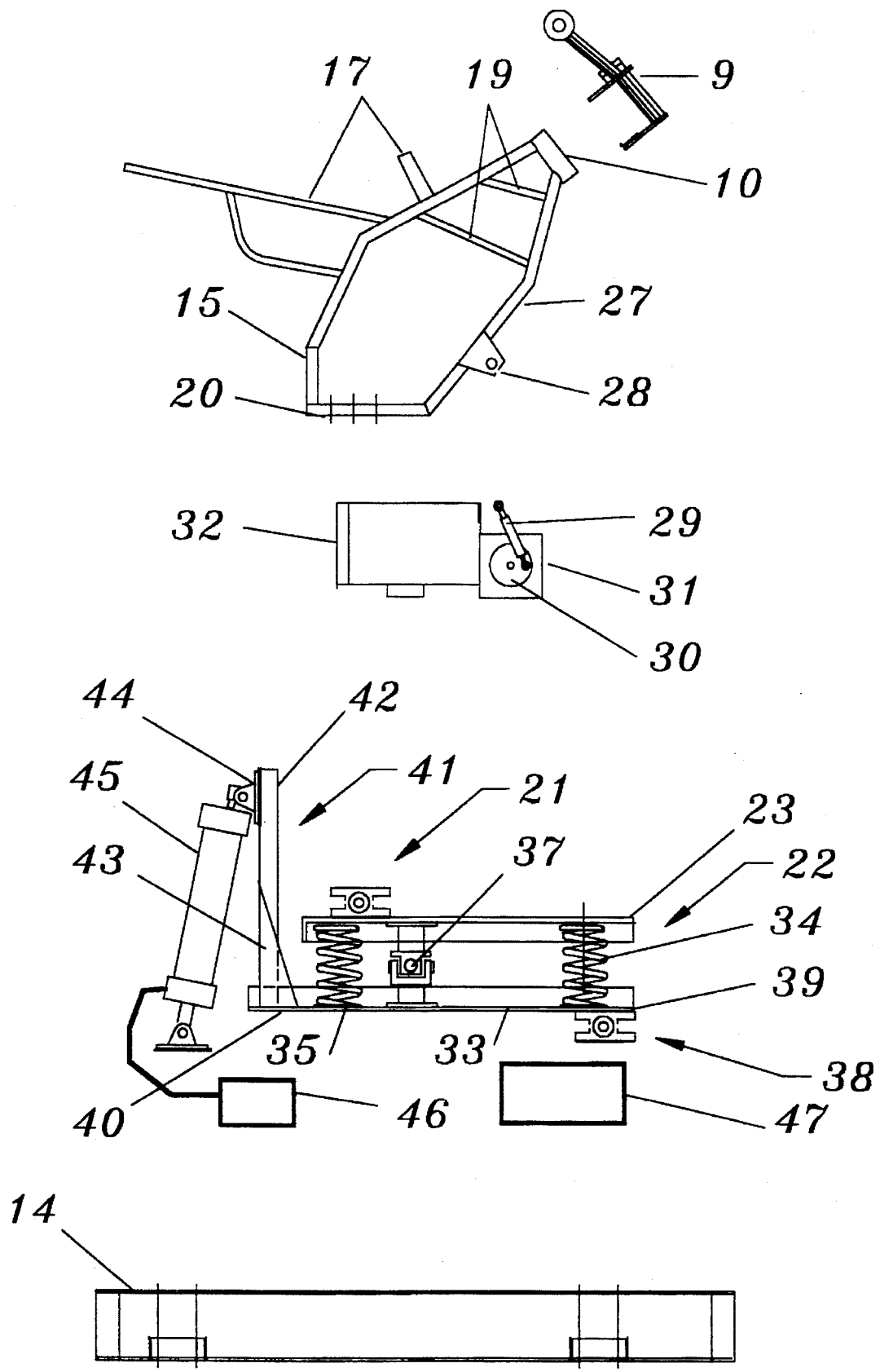
FIG. 5 illustrates an exploded side view of the motorcycle trainer frame and motion elements.
Figure 6:
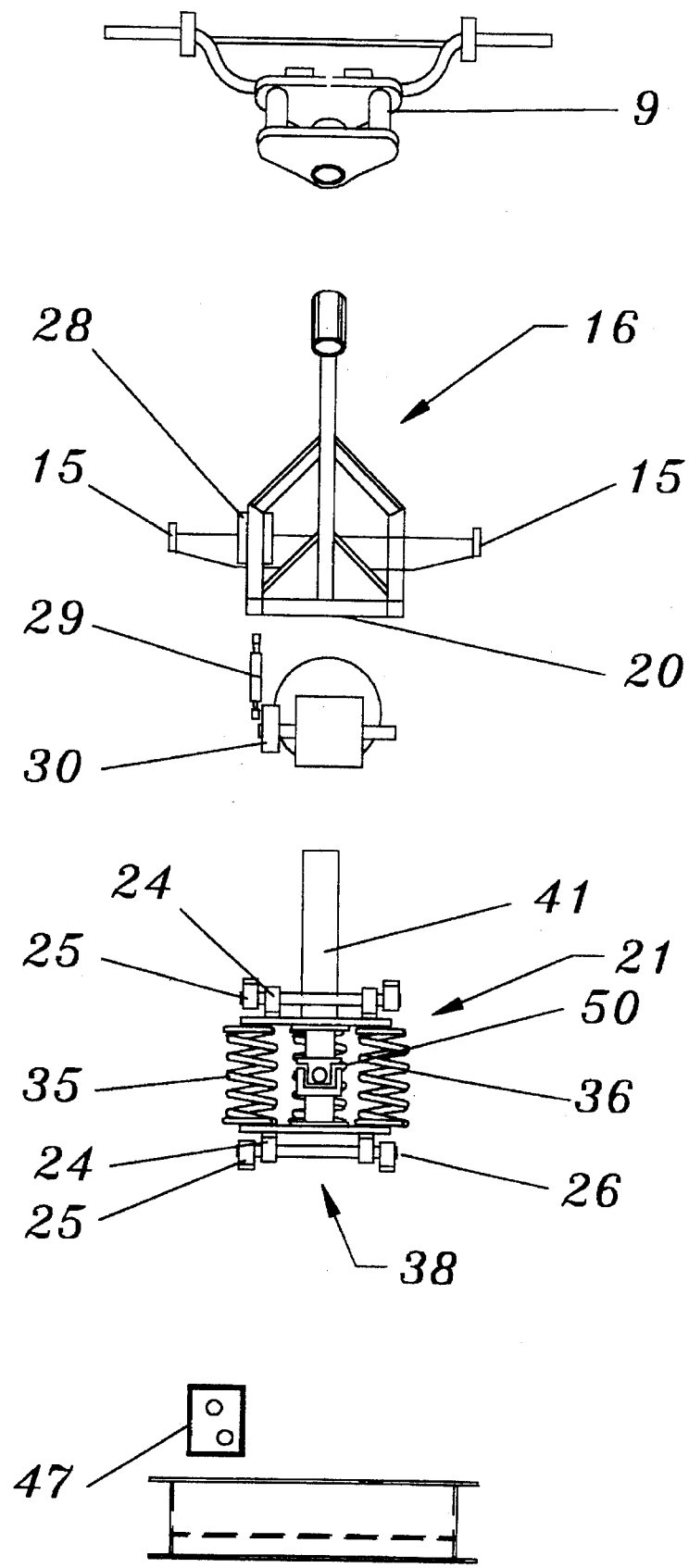
FIG. 6 illustrates an exploded front view of the motorcycle trainer frame and motion elements.

Referring to FIG. 1 and 2, the motorcycle trainer has a body (1) which comprises a right body cover (2) and left body cover (3) which have simulated engine (4) elements and foot pad apertures (5). The body covers (2,3) are tapered (6) in a concave shape to resemble the narrow center of a motorcycle at the point the users legs straddle the motorcycle. The body (1) has a front fender (7) and a rear fender (8) all of which body (1) elements are normally made of molded plastic. The front fender (7) is attached to the handlebar assembly (9) and the rear fender (8) to the seat (10) which is attached to the body covers (2,3). The body (1) is also attached to a skirt (11) attached to the base plate (14) which base plate (14) is attached to a floor. The skirt (11) is comprised of a right skirt (12) and a left skirt (13). Protruding through the pad apertures (5) are foot pads (15).

Referring to FIG. 3 through 6, the body (1) is attached to a frame (16). The frame (16) has a seat support (17), foot pads (15) and handlebar assemble mount (18). The frame (16) structure is generally constructed of rectangular tubing except for handlebar assemble mount (18) and frame cross members (19). The handlebar assemble (9) is mounted in the traditional manner for a motorcycle.

The frame base member (20) is mounted to a pillow block (21) which pillow block (21) is mounted to a spring plate assembly (22) upper spring plate (23). As illustrated the pillow block (21) is comprised of a pair of upper bearings (24) and lower bearings (25) rotatably mounted on a block shaft (26). The frame right lower front support member (27) has an eccentric mount (28) which is attached to the eccentric lever (29). The eccentric lever (29) is attached to the eccentric gear (30) of gear box (31). The gear box (31) provides a gear reduction to the eccentric motor (32) of 10:1. The gear box (31) and the eccentric motor (32) are mounted on the upper spring plate (23).

With this mounting of the frame (16) to the pillow block (21) and eccentric lever (29) the rotation of the eccentric gear (30) causes a vertical motion of the frame through eccentric mount (28) to simulate a motorcycle front wheel movement vertically.

The spring plate assembly (22) has an upper spring plate (23) and a lower spring plate (33) which are connected by a front spring (34), a rear right spring (35), a rear left spring (36), a rear center spring (50) and a universal joint (37). The universal joint (37) retains the plates (23,33) at a specified distance at the point of attachment yet allows a three degree of freedom rotational movement of one plate relative to the other. The force of the springs (34, 35, 36, 50) maintain the relative distance between the plates (23,33) until acted on by a force. Depending on the direction of the force the upper spring plate (23) will tilt front-to-back and side-to-side relative to the lower spring plate (33). This will normally set up an oscillation which is dampened by the springs (34,35, 36,50) to a steady state unless further external force is applied. It has been found by experiment that the upper spring plate (23) and lower spring plate (33) may be constructed of U-shaped beams formed in the shape of a "T" to provide mounting points and allow the body (1) at its narrowest point to cover the spring plate assembly (22).

The lower spring plate (33) is mounted on the plate pillow block (38) at the lower spring plate front end (39). On the lower spring plate rear end (40) a shock tower (41) comprised of a U-shape tower frame member (42) and angular tower support (43) is mounted generally vertically. The tower frame member (42) has a cylinder mount (44) to which a fluid pressure device (45) such as a hydraulic or pneumatic cylinder or ram is attached. The plate pillow block (38) and fluid pressure device (45) are attached to the base plate (14) which is attached to a floor support.

The fluid pressure device (45) may be pneumatic powered by an electric air compressor (46). When it is desired to create sudden vertical motion to the spring plate assembly (22), the fluid pressure device (45) is actuated by for example an electrically controlled solenoid (not shown) as part of the control box (47) function. By experiment it has been found a fluid pressure device (45) displacement of 11 inches provides good training conditions. This motion may be random and not correlated with the motion of the eccentric lever (29). Such a combination gives a repetitive vertical motion caused by the eccentric lever (29) with interspersed sudden jolts due to the fluid pressure device (45). An eccentric lever (29) displacement of 3¾ inches has been found useful to provide vigorous training.

As has been described earlier regarding the spring plate (22), an external force such as that created by the fluid pressure device (45), eccentric lever (29) or even the user shifting position will start secondary motions due to the springs (34,35,36,50) and the universal joint (37). The speed of the eccentric motor (32) may be controlled in the case of a DC electric motor by means of varying power to the motor from the control box (47). The normal twist throttle (48) on the handlebar assembly (9) may be connected to the control box (47) to allow the user to control the speed of the motion. The random speed of the motion of the fluid pressure device (45) may be controlled by the control box (47) or the control box (47) programmed to provide other than random actuation.

Figure 7:
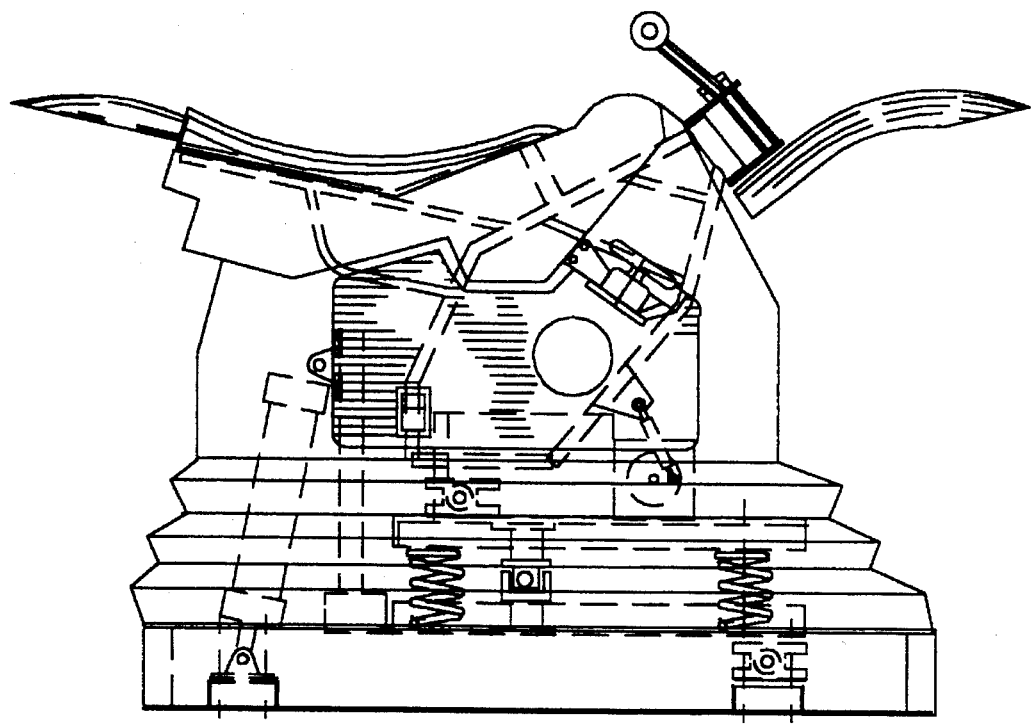
FIG. 7 illustrates a side view of the motorcycle trainer with internal frame and motion elements ghosted.
Figure 8:
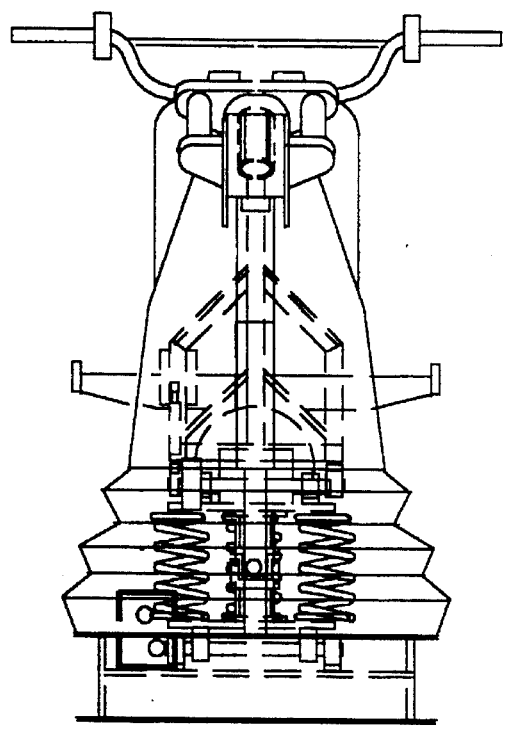
FIG. 8 illustrates a front view of the motorcycle trainer with internal frame and motion elements ghosted.
Figure 9:
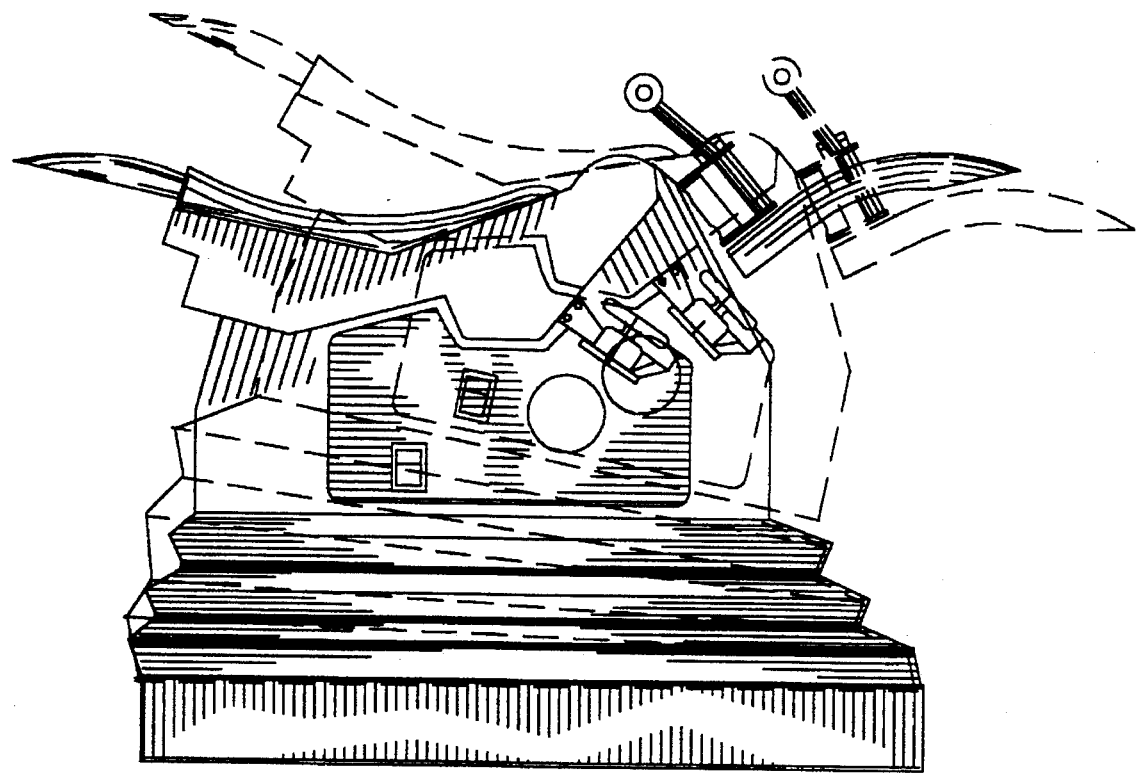
FIG. 9 illustrates a side view of the motorcycle trainer with vertical position change ghosted.
Figure 10:
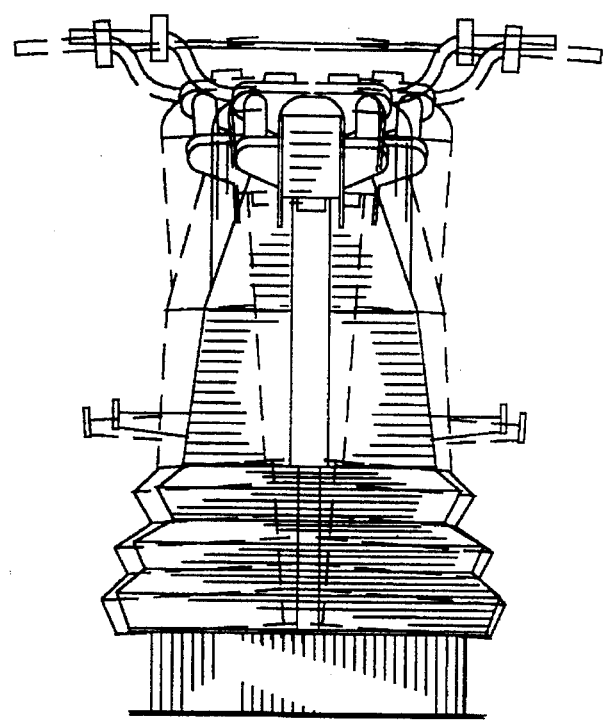
FIG. 10 illustrates a front view of the motorcycle trainer with side tilt change ghosted.

Referring to FIGS. 7 and 8, the motorcycle trainer is illustrated with the internal elements ghosted to show relative location points. FIGS. 9 and 10 illustrate motion of the motorcycle trainer by ghosting a second relative position.

I claim:

1. A device for training motor cross motorcycle riders comprising:

a. a body formed of plastic having a seat attached;

b. a frame having a handlebar assembly attached and a pair of foot pads wherein the body is attached to the frame;

c. the frame pivotally mounted to an upper spring plate by means of a pair of pillow blocks;

d. the upper spring plate attached to a lower spring plate by means of a universal joint and a plurality of springs;

e. the lower spring plate pivotally mounted on a pair of plate pillow blocks which are mounted to a base plate;

f. an eccentric motor mounted on the upper spring plate and attached to the frame by means of an eccentric lever wherein when the eccentric motor is activated the eccentric lever produces vertical motion of the frame about the pillow blocks;

g. a fluid pressure device attached to the lower spring plate and to the base plate wherein when the fluid pressure device is activated the fluid pressure device produces sudden vertical motion of the lower spring plate; and h. the base plate is attached to a floor structure.

2. A device for training a motorcycle rider comprising:

a. a body having pad apertures defined therein and the body tapered to simulate a motorcycle midsection shape with a simulated engine;

b. a frame to which the body is attached and a rear fender and a seat attached to the frame;

c. the frame having a handlebar mount to which a handlebar assembly is mounted and a front fender attached to the handlebar assembly;

d. a skirt attached to the body and to a base plate;

e. two foot pads attached to the frame and protruding through the pad apertures;

f. the frame having a frame base member attached to a pillow block which pillow block is attached to a spring plate assembly at an upper spring plate and the frame having a frame right lower front support member with an eccentric mount which eccentric mount is attached to an eccentric lever;

g. a gear box having an eccentric gear to which the eccentric lever is connected and the gear box powered by an electric motor wherein the electric motor and the gear box are mounted on the upper spring plate such that when the eccentric gear is caused to rotate the eccentric lever imparts vertical motion to the eccentric mount;

h. the upper spring plate connected to a lower spring plate by a universal joint, a front spring, a right rear spring a rear center spring and a left rear spring;

i. the lower spring plate attached to a plate pillow block at a lower spring plate front end which plate pillow block is attached to the base plate and the lower spring plate having a shock tower generally vertically mounted at a lower spring plate rear end wherein the shock tower is attached to a fluid pressure device such that activation of the fluid pressure device causes vertical motion of the spring plate assembly; and j. a means to control the eccentric motor and the fluid pressure device.

3. The device as in claim 2 wherein the body is comprised of a right body cover and a left body cover and the skirt is comprised of a right skirt and a left skirt.

4. The device as in claim 2 wherein the seat is attached to the frame by means of a seat support attached to the frame.

5. The device as in claim 2 wherein the pillow block and the plate pillow block are comprised of an upper bearing, a lower bearing and a block shaft.

6. The device as in claim 2 wherein the means to control is a control box electrically connected to the eccentric motor which is a DC electric motor with variable speed power control and the control box electrically connected to an air compressor and a solenoid which air compressor is connected to the fluid pressure device which is activated by the solenoid.

7. The device as in claim 6 wherein the handlebar assembly has a twist throttle control mechanically connected to the control box to signal varying power levels for application to the eccentric motor.

8. The device as in claim 2 wherein the eccentric gear produces a vertical displacement of 3½ to 4 inches.

9. The device as in claim 2 wherein the fluid pressure device produces a vertical displacement of 10 to 12 inches.

* * * * *